March 14, 1961 C. E. GOSHEN ET AL 2,974,532
ACCELEROMETER
Filed Sept. 6, 1957 2 Sheets-Sheet 2

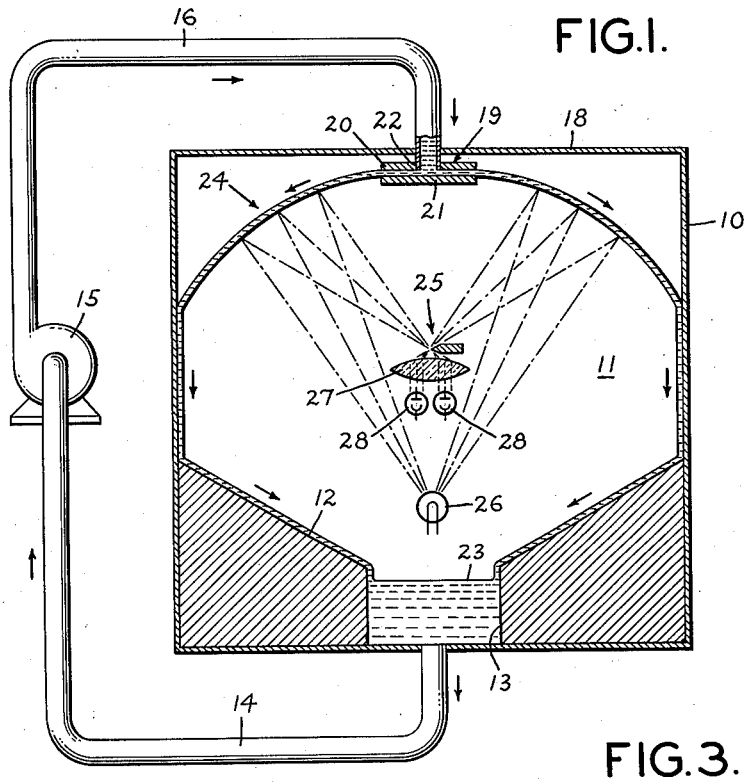
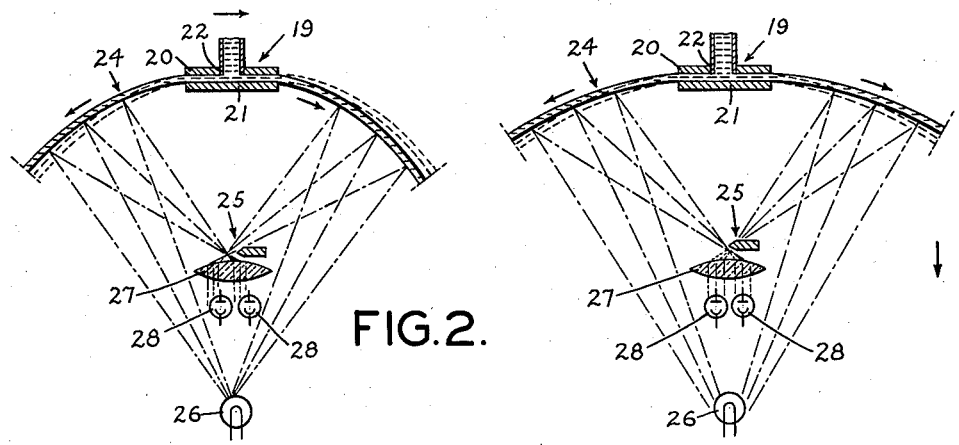

INVENTORS
CHARLES E. GOSHEN
JOSEPH LYMAN
BY
THEIR ATTORNEYS

United States Patent Office

2,974,532
Patented Mar. 14, 1961

2,974,532

ACCELEROMETER

Charles E. Goshen, 7108 Brooksville Road, Chevy Chase, Md., and Joseph Lyman, Northport, N.Y.

Filed Sept. 6, 1957, Ser. No. 682,329

14 Claims. (Cl. 73—516)

The present invention relates to accelerometers and more particularly to new and improved apparatus of this general character which is capable of accurately measuring linear or angular acceleration in a simple yet highly effective manner.

Accelerometers of the type employed heretofore have usually been based on the principle of the spring balance. In a common form of construction, a mass is coupled by a spring to an object whose acceleration is to be determined. When the object experiences an accelerating force, a relative displacement between the object and the mass occurs which is proportional to the accelerating force. Thus, the force and the acceleration produced thereby (or the components thereof in the direction of the displacement) are measured in terms of displacements. The curve which expresses the behaviour of such devices is a parabola and for any small segment of the curve, the device is capable of measuring forces and accelerations to an extremely high degree of accuracy. However, its precision ultimately breaks down at the extreme ends of the curve where the force distance ratio becomes impossible to measure with precision. Since the directions of the errors inherent in measuring either very small or very large forces cannot be predicted, correction cannot be made for such errors. Accordingly, there is a partical limit to the utility of such devices.

It is an object of the invention, accordingly, to provide new and improved accelerometer apparatus which is free from the above-noted deficiencies of the prior art devices.

Another object of the invention is to provide new and improved accelerometer apparatus of the above character which always responds in a standard way when unit force is applied thereto and does not respond at all when no accelerating force is present, the measurements involving only quanta of forces instead of ratios of forces as in the spring balance type of device.

A further object of the invention is to provide new and improved accelerometer apparatus of the above character which enables forces and accelerations to be measured to a high degree of precision without requiring a commensurate degree of precision in the manufacture of the apparatus.

Still another object of the invention is to provide a novel and highly effective spatial reference instrument embodying accelerometer apparatus according to the invention.

These and other objects of the invention are achieved by causing a stream of fluid to flow in free space from a source subjected to accelerating forces that are to be measured. The velocity and direction of flow of the fluid from the source are controlled so that when no accelerating force acts upon the source, the fluid stream assumes a fixed characteristic shape. When accelerating force is applied to the source, it also acts upon the elements of fluid then just leaving the source, so that these fluid elements are constrained to follow a different path than those which left the source prior to the time the accelerating force was applied to the source. As a result, the fluid stream now assumes a different fixed characteristic shape representative of the magnitude and direction of the accelerating force applied to the source. Indications of the magnitudes and directions of the accelerating forces to which the source is subjected are obtained by optical means which responds uniquely to the different characteristic shapes assumed by the fluid stream.

In a preferred embodiment, a liquid such as mercury is expelled radially by pumping means from the space between two parallel circular plates under such conditions as to form a substantially continuous sheet. If the parallel plates are disposed horizontally, under static conditions the influence of gravity will cause the sheet of mercury to assume the shape of a parabola. As the liquid source is subjected to accelerating forces of one kind or another, the sheet of mercury assumes different characteristic shapes, depending upon the magnitudes and directions of the respective forces.

Indications uniquely and accurately representative of the different characteristic shapes assumed by the liquid sheet are provided by placing a knife edge at the center of curvature of the sheet under static conditions (when only gravity is acting upon the sheet), and directing a beam of light from a point source to the surface of the sheet to produce a monitoring image. As in the Foucault knife-edge test, the monitoring image will be accurately and uniquely representative of the shape of the liquid sheet. The monitoring image may be directed to photoelectric pickup means to provide electrical indications thereof either for observation or for actuation of mechanism.

The invention also contemplates the provision of servomechanism responsive to the output of the photosensitive pickup means for restoring the liquid sheet source to its initial position, thereby establishing a reference direction in space.

Desirably, means is also provided for controlling the pumping means supplying the mercury to the space between the parallel plates in response to the liquid pressure of the mercury so as to correct for adverse factors such as changes in viscosity, tending to influence the behaviour of the mercury.

For a better understanding of the invention, reference is made to the following detailed description of several representative embodiments thereof, taken in conjunction with the accompanying drawings in which:

Fig. 1 is a schematic diagram in longitudinal section, of typical accelerometer apparatus constructed according to the invention;

Figs. 2 and 3 illustrate schematically typical characteristic shapes, corresponding to the effects of different accelerating forces, of the liquid sheet formed in the accelerometer of Fig. 1.

Figure 4B:
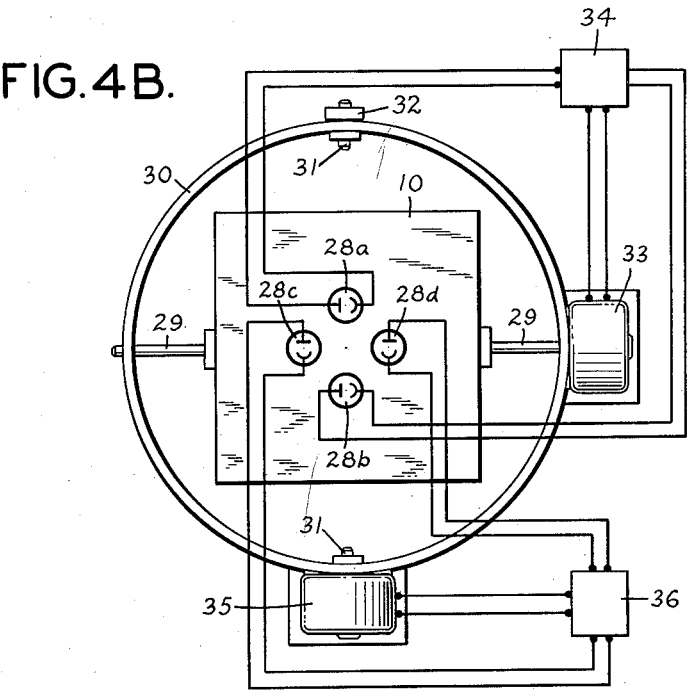
Figs. 4A and 4B are side and top views, respectively, of typical spatial reference direction establishing means embodying accelerometer means according to the invention.

In the representative form of the apparatus shown schematically in Fig. 1, the accelerometer device comprises a container 10 which may be of any desired shape defining a chamber 11 having a funnel-shaped lower wall 12 leading to a central sump 13. The sump 13 communicates with a conduit 14 which is connected to the input of a pump 15. For reasons to be explained in greater detail below, the pump 15 should preferably be of a kind which is sensitively controllable such as a magnetic pump, for example. In such a pump, displacement of the liquid is produced by passing current through it between spaced apart electrodes, in the presence of a magnetic field normal to the direction of current flow. The pump 15 has an output connected to a conduit 16 which passes through the upper wall 18 of the container 10 and terminates in a liquid jet forming nozzle 19 disposed within the chamber 11 near the top thereof. The nozzle 19 may comprise a pair of closely spaced parallel circular plates 20 and 21, the plate 20 having a central bore 22 formed therein in which the end of the conduit 16 is adapted to be tightly fitted.

The sump 13 contains a quantity of liquid 23 such as mercury, for example, which is received by the pump 15 and forced thereby through the conduit 16 to the nozzle 19. At the nozzle 19, the mercury flows out through the space between the parallel circular plates 20 and 21 in the form of a substantially continuous sheet 24. Under normal static conditions and with the apparatus disposed as shown in the figure, the sheet 24 assumes a generally parabolic shape due to the influence of gravity. This is the normal reference condition of the accelerometer which always obtains when no accelerating forces other than the force of gravity are being applied thereto.

When an accelerating force other than gravity is applied to the accelerometer, the sheet 24 of liquid mercury assumes a different but characteristic shape which is uniquely representative of the magnitude and direction of such accelerating force. For example, if the accelerometer is subjected to an accelerating force to the right as indicated by the arrow in Fig. 2, the radius of curvature of the portion of the liquid sheet 24 to the left of the nozzle 19 in a plane through the longitudinal axis of the nozzle 19 and parallel to the direction of the accelerating force increases, whereas the portion of the liquid sheet 24 to the right of the nozzle decreases, the new shape of the sheet being shown in solid lines.

Similarly, when the accelerometer is subjected to a downward accelerating force as indicated by the arrow in Fig. 3, the radius of curvature of the liquid sheet 24 in a plane through the longitudinal axis of the nozzle 19 and parallel to the direction of the accelerating force is increased symmetrically about the nozzle 19, the new position of the sheet 24 being shown in solid lines in Fig. 3. It will be readily apparent that for other directions and magnitudes of accelerating forces, the liquid sheet 24 will assume other different shapes uniquely representative of the magnitudes and directions of such forces.

Indications of the magnitudes and directions of the accelerating forces applied to the accelerometer shown in Fig. 1 are obtained by providing highly accurate indications of changes in the shape of the liquid sheet 24. This is accomplished, according to the invention, by optical means based upon the Foucault knife edge test which is commonly employed to determine the accuracy of spherical and parabolic mirrors.

As shown in Fig. 1, the apparatus for detecting changes in the shape of the liquid sheet 24 comprises a knife edge 25 which is placed at the center of curvature of the liquid sheet 24 (as determined when static conditions prevail and only gravity influences the shape of the liquid sheet 24). A beam of light from a point source 26 is directed to the liquid surface 24 from which it is reflected through suitable lens means 27 to an array of photocells 28. While for simplicity only two photocells 28 are shown in Fig. 1, desirably a minimum of say four cells disposed along mutually perpendicular axes and symmetrically about the optical axis of the lens 27 should be employed.

In operation, the pump 15 expels mercury from the nozzle 19 in the form of a parabolic sheet 24, as shown. The rays of light from the point source 26 and reflected from the surface of the liquid sheet 24 converge at the knife edge 25. If the liquid sheet 24 is perfectly parabolic in shape, a uniformly gray image will be produced in the known manner at the location of the knife edge 25 which will affect all of the photocells 28 in the same manner.

Assume, now, that the accelerometer is subjected to an accelerating force in the direction indicated by the arrow in Fig. 2 so that the liquid sheet 24 is no longer exactly spherical but has the general shape shown in the figure. Under these conditions, the image will no longer be uniformly gray, but there will be a marked difference in shading capable of being easily detected by the photocells 28.

Again, if the accelerometer of Fig. 1 is subjected to a downwardly directed accelerating force, as indicated by the arrow in Fig. 3, so that the liquid sheet 24 assumes the shape shown in solid lines in the figure, the light rays reflected from the surface thereof will now converge at a point between the knife edge 25 and the light source 26. The image viewed by the photocells 28 will appear as a shadow located on the same side of the optical axis of the system as the knife edge. Hence, the right-hand photocell 28 will now receive less light than the left-hand photocell. Thus, the differences in the responses of the photocells 28 will indicate clearly the nature of the change that is taking place in the shape of the liquid surface 24 and will, therefore, be indicative of the magnitudes and directions of the forces imparted to the accelerometer.

Since the change in the shape of the liquid sheet 24 which is required to produce a measurable alteration in the image viewed by the photocells 28 is on the order of one wavelength of light, it will be appreciated that the accelerometer shown in Fig. 1 is capable of providing highly accurate indications of the magnitudes and directions of accelerating forces.

The accelerometer shown in Fig. 1 and described above is susceptible of use in a wide variety of different ways. For example, it could be used as a mapping device to record the navigational history of the flight of an aircraft. This might be accomplished by substituting a conventional motion picture camera for the photocells 28 in order to obtain an instantaneous photographic record of changes in the shape of the liquid sheet 24 produced by different accelerating forces applied to the aircraft. If, on the other hand, the accelerometer is to be used as an automatic navigational instrument, the outputs of the photoelectric cells 28 in Fig. 1 might be fed to computer mechanism to generate signals to actuate mechanism as required to compensate for the various forces acting on an aircraft.

It will be understood that information regarding the flight of an aircraft might be relayed to the ground by radio transmission of the information represented by the electrical outputs of the photocells 28.

Figure 4A:
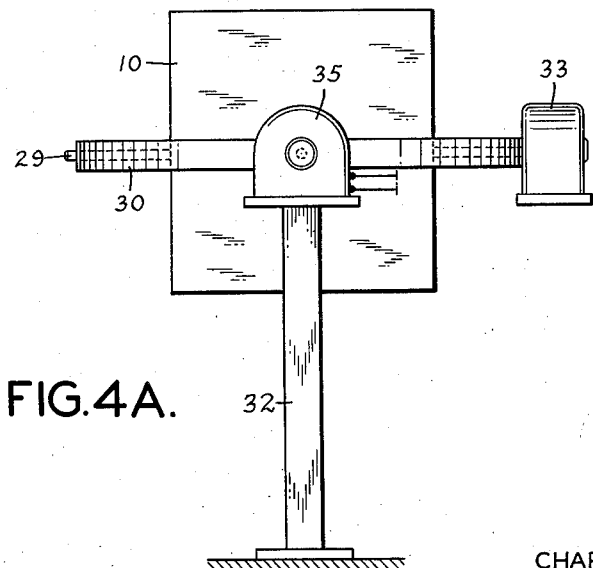

Figs. 4A and 4B illustrate schematically means embodying accelerometer apparatus of the type shown in Fig. 1 for establishing a reference direction in space. As shown in these figures, the container 10 housing the accelerometer apparatus is provided with pivots 29 journaled in a gimbal ring 30. The ring 30, in turn, carries pivots 31 journaled in a support 32 for rotation about an axis mutually perpendicular to the axis containing the pivots 29. Secured to the gimbal ring 30 is a motor 33 which is connected to drive one of the shafts 29 in response to the output from a controller 34 which is responsive to the signals generated by the photocells 28a and 28b.

Secured to the support 32 is a second motor 35 which is adapted to drive one of the shafts 31 in response to an output from a controller 36 responsive to the signals generated by the photocells 28c and 28d.

In operation, and assuming that the accelerometer apparatus within the container 10 is positioned so as to be subjected only to the force of gravity, the liquid sheet 24 therein is perfectly parabolic in shape and there are no outputs from the controllers 34 and 36 to the motors 33 and 35, respectively. If now an accelerating force in any direction is applied to the container 10, it will produce a corresponding change in the shape of the liquid sheet 24 which will result in an output from appropriate ones of the photocells 28a, 28b, 28c and 28d. This will produce an output from either or both of the controllers 34 and 36 to actuate the motors 33 and 35, respectively, as required to completely compensate for the accelerating force applied to the container 10. In this fashion, the axis of the container 10 will always return to its original direction in space so that a reference direction in space will be established thereby.

The invention thus provides novel and highly effective accelerometer apparatus for determining the magnitudes and directions of accelerating forces applied to an object. By utilizing a liquid sheet capable of assuming different shapes uniquely representative of the directions and magnitudes of the acceleration forces, a standard response obtains when a unit of force is applied. Further, by utilizing optical techniques based upon the principles underlying the Foucault knife edge test, accelerations producing an alteration in the shape of the liquid sheet of the order of one wavelength of light can be readily detected so that measurements of great precision can be obtained, although the apparatus itself is not required to be manufactured to a commensurate degree of precision.

In order to minimize turbulent influences, it may be desirable to create a vacuum within the container by suitable vacuum pumping means (not shown). Also, possible inaccuracies arising from variations in the viscosity of the mercury caused by factors such as temperature changes, for example, may be compensated for by continuous adjustment of the current supplied to the magnetic pump in response to variations in the pressure of the liquid of the mercury, any suitable means (not shown) being employed for this purpose.

The several embodiments described herein and illustrated in the drawings are susceptible of modification in form and detail within the spirit of the invention and the latter is intended to encompass all variations coming within the scope of the appended claims.

We claim:

1. In accelerometer apparatus, the combination of a source of fluid under pressure, nozzle means connected to receive fluid from the source and arranged to form in space a fluid body composed of unsupported fluid particles and having a surface of reference shape under reference conditions, and means responsive to change of shape of said surface.

2. In accelerometer apparatus, the combination of a source of fluid under pressure, nozzle means connected to receive fluid from the source and arranged to establish in space a flow of unsupported fluid particles forming a fluid surface having a reference shape under reference conditions, and means responsive to change of shape of said surface.

3. In accelerometer apparatus, the combination of a source of fluid, fluid circulating means, nozzle means connected to receive fluid from the source through the circulating means and arranged to establish in space a fluid sheet composed of unsupported fluid particles and having a reference shape under reference conditions, and means responsive to change of shape of said surface.

4. In accelerometer apparatus, the combination of a source of fluid under pressure, nozzle means connected to receive fluid from the source and arranged to form in space a fluid body composed of unsupported fluid particles and having a surface of reference shape under reference conditions, and optical means responsive to change of shape of said surface.

5. In accelerometer apparatus, the combination of a source of fluid under pressure, nozzle means connected to receive fluid from the source and arranged to establish in space a flow of unsupported fluid particles forming a fluid surface having a reference shape under reference conditions, and optical means disposed to form an optical image responsive to change of shape of said surface.

6. In accelerometer apparatus, the combination of a source of fluid, fluid circulating means, nozzle means connected to receive fluid from the source through the circulating means and arranged to establish in space a fluid sheet composed of unsupported fluid particles and having a curved reference shape under reference conditions, and Foucault knife-edge test means cooperable with said fluid sheet to form an optical image responsive to change of shape of said sheet.

7. In accelerometer apparatus, the combination of a source of fluid under pressure, nozzle means connected to receive fluid from the source and arranged to form in space a fluid body composed of unsupported fluid particles and having a surface of reference shape under reference conditions, optical means disposed to form an optical image responsive to change of shape of said surface, and photosensitive means responsive to said optical image.

8. In accelerometer apparatus, the combination of a source of fluid under pressure, nozzle means connected to receive fluid from the source and arranged to form in space a fluid body composed of unsupported fluid particles and having a surface of reference shape under reference conditions, optical means disposed to form an optical image responsive to change of shape of said surface, and photoelectric means responsive to said optical image.

9. In accelerometer apparatus, the combination of a source of fluid, fluid circulating means, nozzle means connected to receive fluid from the source through the circulating means and arranged to establish in space a fluid sheet composed of unsupported fluid particles and having a curved reference shape under reference conditions, Foucault knife-edge test means cooperable with said fluid sheet to form an optical image responsive to change of shape of said sheet, and photoelectric means disposed to receive said image to produce electric signals characteristically representative of changes in shape of said fluid sheet.

10. In accelerometer apparatus, the combination of a source of fluid under pressure, nozzle means connected to receive fluid from the source and arranged to form in space a liquid body composed of unsupported fluid particles and having a reflecting surface of reference shape under reference conditions, and optical means including a light source disposed to form an optical image responsive to change of shape of said surface.

11. In spatial reference apparatus, the combination of an unstable support; accelerometer means movably mounted on said support and comprising a source of fluid under pressure, nozzle means connected to receive fluid from the source and arranged to form in space a fluid body composed of unsupported fluid particles and having a surface of reference shape under reference conditions, and optical means disposed to form an optical image responsive to change of shape of said surface; and means responsive to said image for moving said accelerometer means to compensate for movement of said unstable support.

12. In spatial reference apparatus, the combination of an unstable support; accelerometer means comprising a source of fluid under pressure, nozzle means connected to receive fluid from the source and arranged to form in space a fluid body composed of unsupported fluid particles and having a surface of reference shape under reference conditions, and optical means disposed to form an optical image responsive to change of shape of said surface; means mounting said accelerometer means on said unstable support for rotation about mutually perpendicular axes; and means responsive to said image for rotating said accelerometer means about said mutually perpendicular axes to compensate for movement of said unstable element.

13. In accelerometer apparatus, the combination of nozzle means having closely-spaced, parallel circular surfaces and inlet port means for introducing fluid between said surfaces centrally thereof, fluid circulating means including said inlet port means for projecting a reflecting fluid from said nozzle means in the form of a curved reflecting sheet, point light source means positioned to direct light to said curved reflecting surface, an element positioned in the path of light reflected from said surface to form an image representative of the shape of said surface, and photosensitive means responsive to said image.

14. In accelerometer apparatus, the combination of nozzle means having closely-spaced, parallel circuit surfaces and inlet port means for introducing fluid between said surfaces centrally thereof, fluid circulating means including said inlet port means for projecting a reflecting fluid from said nozzle means in the form of a curved reflecting sheet having an optical axis, point light source means positioned to direct light to said reflecting sheet, knife-edge means in the vicinity of the center of curvature of sheet to form an image uniquely characteristic of the shape of said sheet, and photoelectric means responsive to said image to provide electrical signals representative of the shape of said sheet.

References Cited in the file of this patent

UNITED STATES PATENTS

| | | |
|---|---|---|
| 1,955,315 | Styer | Apr. 17, 1934 |
| 2,100,334 | Horton | Nov. 30, 1937 |
| 2,268,017 | Busick et al. | Dec. 30, 1941 |
| 2,319,932 | Jacobs | May 25, 1943 |
| 2,319,940 | Marrison | May 25, 1943 |
| 2,391,966 | Harrison | Jan. 1, 1946 |
| 2,603,767 | Ferrill | July 15, 1952 |

FOREIGN PATENTS

| | | |
|---|---|---|
| 188,696 | Great Britain | Nov. 10, 1922 |